United States Patent [19]

Simmons

[11] Patent Number: 5,266,100
[45] Date of Patent: Nov. 30, 1993

[54] ALKYL SUBSTITUTED POLYIMIDE, POLYAMIDE AND POLYAMIDE-IMIDE GAS SEPARATION MEMBRANES

[75] Inventor: John W. Simmons, Wilmington, Del.

[73] Assignee: E. I. Du Pont de Nemours and Company, Wilmington, Del.

[21] Appl. No.: 940,194

[22] Filed: Sep. 2, 1992

[51] Int. Cl.$^5$ .................... B01D 53/22; B01D 71/64
[52] U.S. Cl. ............................. 95/43; 95/34; 96/14
[58] Field of Search .................. 55/16, 68, 158

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 210/23 |
| 3,899,309 | 8/1975 | Hoehn et al. | 55/16 |
| 4,240,914 | 12/1980 | Iwama et al. | 210/500 |
| 4,307,135 | 12/1981 | Fox | 427/244 |
| 4,358,378 | 11/1982 | Iwama et al. | 210/500 |
| 4,378,324 | 3/1983 | Makino et al. | 264/41 |
| 4,378,400 | 3/1983 | Makino et al. | 428/220 |
| 4,385,084 | 5/1983 | Iwama et al. | 427/244 |
| 4,420,568 | 12/1983 | Wang et al. | 436/536 |
| 4,440,643 | 4/1984 | Makino et al. | 55/158 X |
| 4,460,526 | 7/1984 | Makino et al. | 264/41 |
| 4,474,662 | 10/1984 | Makino et al. | 55/158 X |
| 4,474,663 | 10/1984 | Nakajima et al. | 210/635 |
| 4,474,858 | 10/1984 | Makino et al. | 55/158 X |
| 4,485,056 | 11/1984 | Makino et al. | 264/41 |
| 4,485,140 | 11/1984 | Gannett et al. | 428/260 |
| 4,512,893 | 4/1985 | Makino et al. | 55/158 X |
| 4,523,893 | 6/1985 | Johst et al. | 417/68 |
| 4,528,004 | 7/1985 | Makino et al. | 55/158 |
| 4,636,314 | 1/1987 | Beuhler et al. | 55/158 X |
| 4,690,873 | 9/1987 | Makino et al. | 55/158 X |
| 4,696,994 | 9/1987 | Nakajima et al. | 528/176 |
| 4,705,540 | 11/1987 | Hayes | 55/16 |
| 4,714,482 | 12/1987 | Polak et al. | 55/158 |
| 4,717,393 | 1/1988 | Hayes | 55/16 |
| 4,717,394 | 1/1988 | Hayes | 55/16 |
| 4,725,642 | 2/1988 | Gannett et al. | 524/600 |
| 4,758,875 | 7/1988 | Fujisaki et al. | 357/72 |
| 4,830,640 | 5/1989 | Nakamura et al. | 55/158 |
| 4,832,713 | 5/1989 | Yamada et al. | 55/158 |
| 4,838,900 | 6/1989 | Hayes | 55/16 |
| 4,851,505 | 7/1989 | Hayes | 528/353 |
| 4,880,442 | 11/1989 | Hayes | 55/16 |
| 4,897,092 | 1/1990 | Burgoyne, Jr. et al. | 55/158 X |
| 4,912,197 | 3/1990 | Hayes | 528/353 |

(List continued on next page.)

FOREIGN PATENT DOCUMENTS

| | | | |
|---|---|---|---|
| 0321638 | 6/1989 | European Pat. Off. | 55/158 |
| 0410793 | 1/1991 | European Pat. Off. | 55/16 |
| 60-022902 | 2/1985 | Japan | 55/158 |
| 60-082103 | 5/1985 | Japan | 55/158 |

(List continued on next page.)

Primary Examiner—Robert Spitzer
Attorney, Agent, or Firm—Cary A. Levitt

[57] ABSTRACT

Novel aromatic polyimide, polyamide and polyamide-imide gas separation membranes and the process of using such membranes to separate one or more gases from a gaseous mixture is disclosed. The polyimides, polyamides and polyamide-imides are formed from diamines of the formula

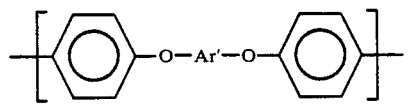

where Ar' is

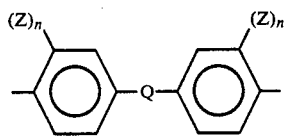

Q is nothing or an aromatic group and Z is independently alkyl groups having 1 to 10 carbon atoms, most preferably a tertiary butyl group, n is an integer from 0 to 4, preferably 1.

17 Claims, No Drawings

U.S. PATENT DOCUMENTS

| | | | |
|---|---|---|---|
| 4,931,539 | 6/1990 | Hayes | 528/353 |
| 4,932,982 | 6/1990 | Hayes | 55/158 X |
| 4,932,983 | 6/1990 | Hayes | 55/16 |
| 4,935,490 | 6/1990 | Hayes | 528/353 |
| 4,948,400 | 8/1990 | Yamada et al. | 55/158 |
| 4,949,405 | 5/1990 | Kohn | 55/16 X |
| 4,952,220 | 8/1990 | Langsam et al. | 55/158 |
| 4,954,144 | 9/1990 | Burgoyne, Jr. et al. | 55/158 X |
| 4,968,331 | 11/1990 | Sakashita et al. | 55/158 |
| 4,975,190 | 12/1990 | Sakashita et al. | 55/158 X |
| 4,981,497 | 1/1991 | Hayes | 55/16 |
| 4,983,191 | 1/1991 | Ekiner et al. | 55/158 |
| 4,988,371 | 1/1991 | Jeanes et al. | 55/158 X |
| 4,997,462 | 3/1991 | Nakatani et al. | 55/158 X |
| 5,009,679 | 4/1991 | Angus et al. | 55/158 X |
| 5,015,270 | 5/1991 | Ekiner et al. | 55/16 |
| 5,032,149 | 7/1991 | Hayes | 55/16 |
| 5,034,027 | 7/1991 | Tien et al. | 55/158 X |
| 5,042,992 | 8/1991 | Blinka et al. | 55/158 X |
| 5,042,993 | 8/1991 | Meier et al. | 55/158 X |
| 5,045,093 | 9/1991 | Meier et al. | 55/158 X |
| 5,067,970 | 11/1991 | Wang et al. | 55/158 X |
| 5,071,452 | 12/1991 | Avrillon et al. | 55/158 X |
| 5,074,891 | 12/1991 | Kohn et al. | 55/158 X |
| 5,076,816 | 12/1991 | Avrillon et al. | 55/158 X |
| 5,076,817 | 12/1991 | Hayes | 55/158 X |
| 5,080,698 | 1/1992 | Krizan | 55/158 |
| 5,085,676 | 2/1992 | Ekiner et al. | 55/158 |
| 5,085,774 | 2/1992 | Ekiner et al. | 55/158 X |
| 5,122,941 | 5/1992 | Kasai et al. | 55/158 X |
| 5,178,650 | 1/1993 | Hayes | 55/158 X |
| 5,178,940 | 1/1993 | Matsumoto et al. | 55/158 X |

FOREIGN PATENT DOCUMENTS

| | | | |
|---|---|---|---|
| 62-074410 | 4/1987 | Japan | 55/158 |
| 62-074411 | 4/1987 | Japan | 55/158 |
| 62-114611 | 5/1987 | Japan | 55/158 |
| 62-163712 | 7/1987 | Japan | 55/158 |
| 63-091122 | 4/1988 | Japan | 55/16 |
| 63-166415 | 7/1988 | Japan | 55/158 |
| 1-194905 | 8/1989 | Japan | 55/158 |
| 2-222717 | 9/1990 | Japan | 55/158 |
| 2244997 | 12/1991 | United Kingdom | 55/158 |

5,266,100

ALKYL SUBSTITUTED POLYIMIDE, POLYAMIDE AND POLYAMIDE-IMIDE GAS SEPARATION MEMBRANES

FIELD OF THE INVENTION

The present invention relates to aromatic polyimide, polyamide and polyamide-imide gas separation membranes and the process for separating one or more gases from a gaseous mixture using such membranes. The polyimides, polyamides and polyamide-imides are derived from diamines which incorporate dialkyl substituted diamines in the polymer chain. The inventive gas separation membranes exhibit exceptionally good permeation rates with good selectivity.

PRIOR ART

U.S. Pat. No. Re 30,351; U.S. Pat. Nos. 3,822,202 and 3,899,309 disclose gas separation membrane materials comprising certain semi-rigid aromatic polyimides, polyamides, and polyesters.

U.S. Pat. Nos. 4,240,914; 4,358,378; 4,385,084 and 4,420,568 disclose an asymmetric polyimide gas separation membrane prepared from an aliphatic polyimide material.

U.S. Pat. No. 4,307,135 discloses the preparation of an asymmetric polyimide membrane from a soluble polyimide.

U.S. Pat. Nos. 4,378,324; 4,460,526; 4,474,663; 4,485,056 and 4,523,893 disclose a process for preparing asymmetric polyimide membranes.

U.S. Pat. No. 4,378,400 discloses polyimide gas separation materials which incorporate 3,3',4,4'-biphenyltetracarboxylic dianhydride residues.

U.S. Pat. No. 4,705,540 discloses aromatic polyimide gas separation membrane materials based on rigid polyimides.

U.S. Pat. Nos. 4,485,140; 4,696,994; 4,725,642 and 4,758,875 teach the incorporation of diamines, shown below, into polyimide materials:

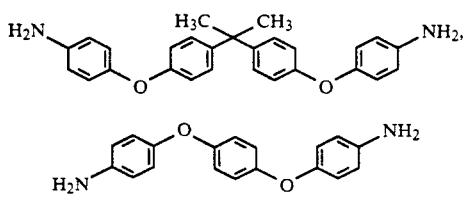

SUMMARY OF THE INVENTION

The present invention relates to certain polyimide, polyamide and polyamide-imide separation membranes particularly useful for separating gases and the process for using them. This class of membrane materials compositionally contain diamines which incorporate dialkyl substituted aromatic units in the polymer chain. Membranes formed from this class of polyimide materials exhibit superior gas permeability and good selectivity. It is believed that the high permeabilities of some gases from multicomponent mixtures is due to the molecular free volume in the polymer which is created by the alkyl substituents on the diamines.

DETAILED DESCRIPTION OF THE INVENTION

The present invention relates to the discovery that gas separation membranes exhibiting exceptional gas permeability can be obtained by forming such gas separation membranes from aromatic polyimides, polyamides and polyamide-imides which incorporate dialkyl-substituted diamine having the structural formula $H_2N-Ar-NH_2$ where $-Ar-$ is

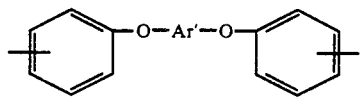

where $-Ar-$ is

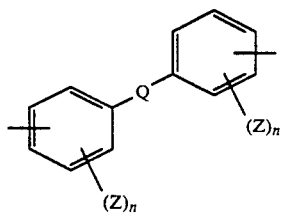

$-Q-$ is nothing or $R'$.

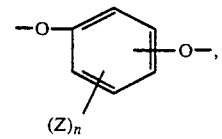

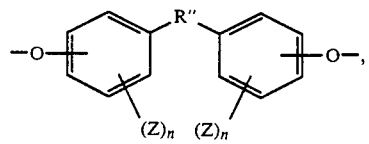

$-R'-$ is

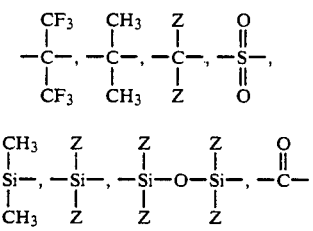

or mixtures thereof, where Z is independently $-H$, alkyl groups having 1 to 6 carbon atoms, aromatic groups having 6 to 12 carbon atoms, or halogen groups such as $-F$, $-Cl$, $-Br$, or $-I$, where n is an integer from 0 to 4. $R''$ is

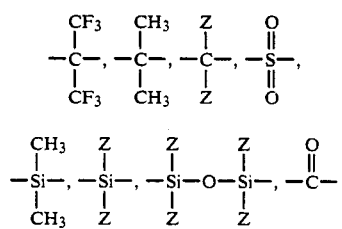

or

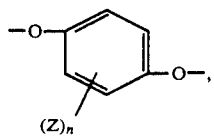

or mixtures thereof.

The alkyl-substituted aromatic diamine may be mixed with other aromatic diamines, such as, for example, aromatic diamines having the general structural formula H$_2$N—Ar''—NH$_2$ where Ar'' is, for example,

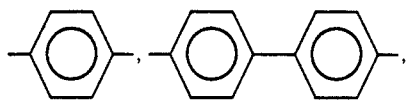

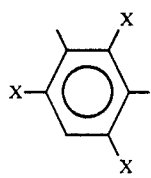

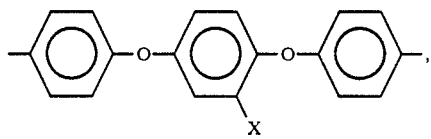

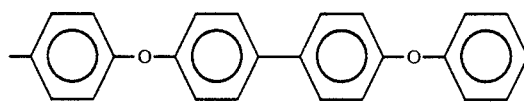

or mixtures thereof, where X is an alkyl group having 1 to 6 carbon atoms or a phenyl group and X' is —O—, —S—,

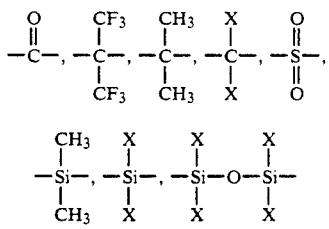

or mixtures thereof. The foregoing examples are not limiting; Ar'' may also be other aromatic constituents which are known in the art.

The dialkyl substituted aromatic diamine comprises 1-100%, preferably 50-100% of the total diamine and the other aromatic diamine comprises 0-99%, preferably 0-50% of the total diamine.

Gas separation membranes prepared from such diamines possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said diamines in the polyimide chain. In particular, the alkyl substituents on the diamines increase the molecular free volume of the polymer.

Generally, an inverse relationship between the gas permeation rate (flux) and the selectivity of said gas over other gases in a multicomponent gas mixture has been exhibited within polymer classes, such as polyimides, polyamides and polyamide-imides. Because of this, prior art polyimide, polyamide and polyamide-imide gas separation membranes tend to exhibit either high gas permeation rates at the sacrifice of high gas selectivities or high gas selectivities at the sacrifice of high permeation rates. It would be highly desirable for gas separation membranes to exhibit high gas permeation rates while maintaining high gas selectivities.

The present invention circumvents the above shortcomings and provides exceptionally high permeation polyimide, polyamide and polyamide-imide gas separation membranes while maintaining good selectivity.

Polyimide materials useful in the present invention contain the repeating unit:

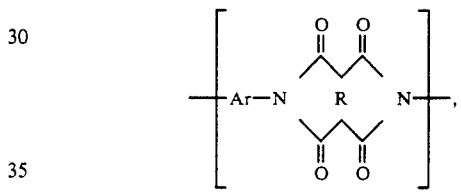

where —Ar— is 0-99% of any aromatic diamine moiety and 1-100% of an aromatic diamine moiety having the following formula:

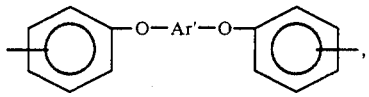

where —Ar'— is

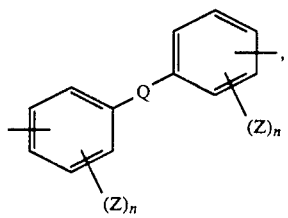

where Q is nothing or R', preferably nothing.

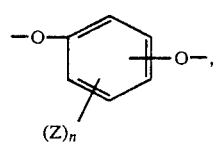

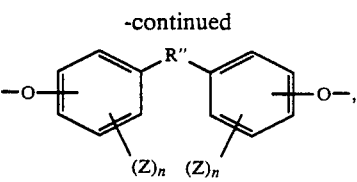

—R'— is

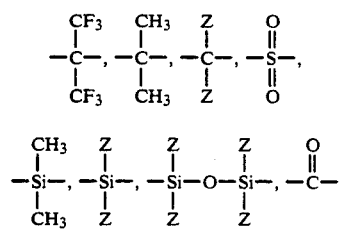

or mixtures thereof, where Z is independently —H, alkyl groups having 1 to 6 carbon atoms, aromatic groups having 6 to 12 carbon atoms, or halogen groups such as —F, —Cl, —Br, or —I, where n is an integer from 0 to 4. The —Z constituent on the aromatic diamine moiety is preferably a tertiary butyl group.

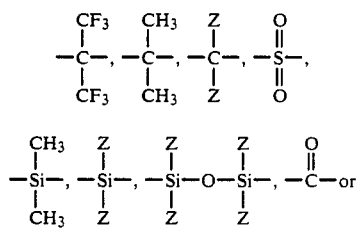

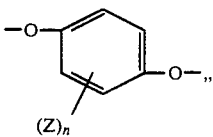

or mixtures thereof.

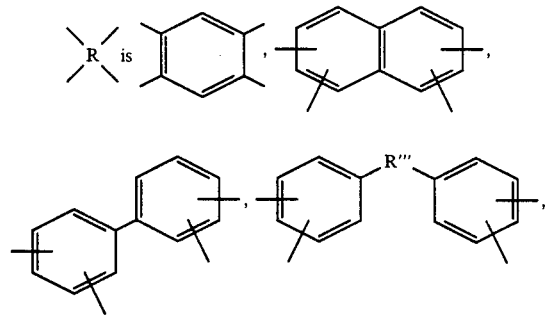

or mixtures thereof. R'" is

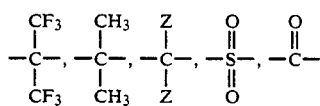

or mixtures thereof, preferably

In general, the polyimides of this invention have a weight average molecular weight within the preferred range of from about 23,000 up to about 400,000 and more preferably from about 50,000 up to about 280,000.

In the preferred process for preparing the polyimides of this invention, approximately equimolar quantities of a dianhydride and the diamine are reacted by well-established procedures known in the art. In general, this process involves the polycondensation of the diamine and the dianhydride followed by the dehydration of the resulting polyamic acid to form a polyimide.

Preferably, the diamine is first dissolved in a polymerization solvent medium and the dianhydride is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

The solvents which may be used in the polymerization process are organic solvents, preferably polar aprotic, whose functional groups do not react with either the dianhydride or diamine reactant to any appreciable extent, and in which either the dianhydride or diamine, preferably both, and the polymer are soluble. Examples of suitable solvents include N,N-dialkylcartoxylamide solvents such as N,N-dimethylformamide or N,N-dimethylacetamide; N-methyl-pyrrolidone; gamma-butyrolactone; pyridine; diglyme; and like materials as well as mixtures of such solvents.

Polymerization is conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with alcohol or water (e.g., methanol) and washed with additional alcohol or water.

The resulting polyimides may then, if desired, be blended using conventional solution blending technology to yield a blend having specifically tailored properties.

Polyamide materials useful in the present invention contain the repeating unit:

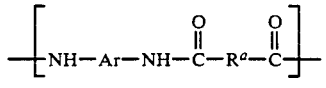

where Ar is as previously defined, and where $R^a$ is any aromatic diacid moiety such as

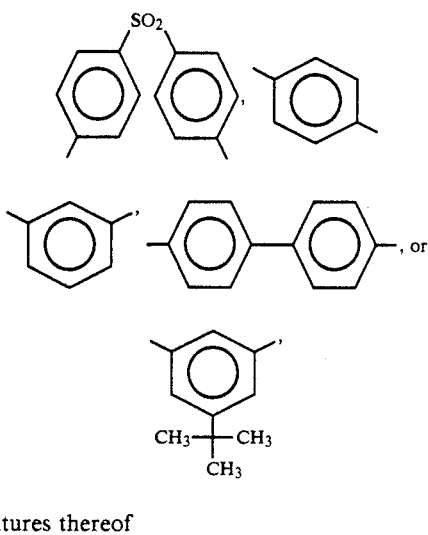

or mixtures thereof preferably 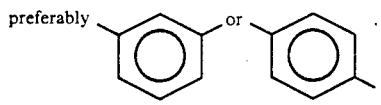

Polyamide-imide materials useful in the present invention contain the repeating unit:

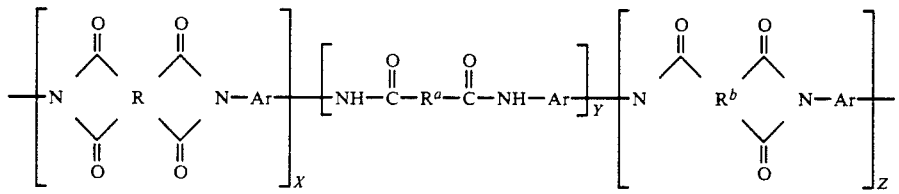

where Ar, R and $R^a$ are previously defined. $R^b$ is any triacid aromatic moiety, such as

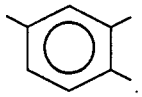

x, y and z are fractions where $x+y+z=1$. Ar may be different in each occurrence. The polyamide-imide materials may also be mixtures of the polyimides and polyamides described above.

The polyamides and polyamide-imides may be prepared by methods well known in the art.

The preferred polyimide, polyamide and polyamide-imide compositions of the present invention are soluble in a wide range of ordinary organic solvents. This is a great advantage for the ease of fabrication of industrially useful gas separation membranes. To prepare membranes in accordance with this invention, the polymer solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present. Insoluble polyimide compositions may be formed into gas separation membranes from their corresponding polyamic acid precursors followed by conversion to the polyimide.

Gas separation membranes prepared from the polyimide, polyamide and polyamide-imide materials of the present invention possess an excellent balance of gas permeation rates and selectivities for one gas over other gases in a multicomponent gas mixture. Generally, prior polyimide, polyamide and polyamide-imide gas separation materials exhibit an inverse relationship between the gas permeation rate and the selectivity of said gas over other gases in a multicomponent gas mixture. The preferred materials of the present invention (Example 1) have been found to have a permeation rate for oxygen of 11.0 Barrer while maintaining a good oxygen/nitrogen selectivity.

The polyimides, polyamides and polyamide-imides described in this invention also have high inherent thermal stabilities. They are generally stable up to 400° C. in air or inert atmospheres. The glass transition temperatures of these polyimides, polyamides and polyamide-imides are generally above 250° C. The high temperature characteristics of these compositions can help to prevent the membrane compaction problems observed in other polymers at even moderate temperatures.

The polyimide, polyamide and polyamide-imide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability of gasses through membranes is defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein cm$^3$/sec (STP) is the flux (flow rate) in units volume per seconds of permeated gas at standard temperature and pressure, cm. is the thickness of the film, cm$^2$ is the area of film, and cm. Hg is the pressure (or driving force).

The selectivity of a membrane in separating a two component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, a $O_2/N_2 = 10$ indicates that the subject membrane allows oxygen gas to pass through at a rate 10 times that of nitrogen.

The invention will now be further illustrated by way of the following Examples, which are considered to be illustrative only, and non-limiting.

EXAMPLES

Example 1

To a stirred solution of 4,4'-bis(4-aminophenoxy)-3,3'-di-tert-butylbiphenyl (96.13 g, 0.20 mol) in N-methylpyrrolidone (750 ml) was portionwise added 4,4'-[2,2,2-trifluoro-1-(trifluoromethyl)ethylidene]-bis(1,2-benzenedicarboxylic acid dianhydride) ("6FDA") (88.85 g, 0.20 mol) under an inert atmosphere at room temperature. The yellow solution was allowed to stir overnight at room temperature. A solution of triethylamine (45.5 g, 0.45 mol), acetic anhydride (46.0 g, 0.45 mol) and N-methylpyrrolidone (100 ml) was added with rapid stirring at room temperature. The reaction mixture was heated to 100° C. for 2 hours. After cooling the reaction mixture to room temperature, the polymer was precipitated into water. The yellow polymer was washed with water and methanol. The polymer was air-dried overnight at room temperature and then dried in a vacuum oven (20 inches mercury) at 230° C. for 3 hours to yield 175.0 g product. (I.V.=0.68, 0.5 wt. % polymer in NMP, dL/g).

The resulting polyimide was soluble in N-methylpyrrolidone, N,N'-dimethylacetamide, and dichloromethane but insoluble in acetone.

A film of the above polyimide was cast from a 20% solution in N-methylpyrrolidone onto a glass plate at 120° C. with 15-mil ($38 \times 10^{-5}$ m) knife gap. The film was dried on the plate at 120° C. for 60–120 minutes, cooled to room temperature and air-dried overnight. The film was then further dried in a vacuum oven (20 inches mercury) at 230° C. for 18 hours.

The above film (film thickness=2.0 mils) was tested for mixed gas $O_2/N_2$(21/79 mole ratio) permeabilities at 500 psig ($34.5 \times 10^{-5}$ Pa), at 25° C. The results are reported below:

$O_2$ Productivity: 11.0 Barrer
$O_2/N_2$ Selectivity: 5.34.

EXAMPLE 2

To a stirred solution of 4,4'-bis(4-aminophenoxy)-3,3'-di-tert-butylbiphenyl (149.1 g, 0.31 mol) in N-methylpyrrolidone (1000 ml) was added 5,5'-sulfonyl-bis-1,3-isobenzofurandione ("DSDA", 111.1 g, 0.31 mol). The reaction solution was slowly heated to boiling while allowing the distillates to collect. After 325 ml of distillates had been collected (about 4 hours), the remaining distillates were allowed to flow back into the reaction mixture. After boiling at 203° C. for 14 hours, the reaction solution was allowed to cool to room temperature. The solution was diluted with additional N-methylpyrrolidone and precipitated in water. The resulting polymer was washed with water and methanol. The light brown polymer was air-dried overnight and dried in a vacuum oven (20 inches mercury) at 230° C. for 3 hours to yield 245 g product (I.V.=0.88, 0.5 wt. % polymer in NMP, dL/g).

This polyimide was soluble at greater than 20% solids (based on polymer weight) in N-methylpyrrolidone, dimethylacetamide, and dichloromethane.

A film of the above polymer was cast from a 20% solids NMP solution onto a glass plate at 120° C. using a 15 mil ($38 \times 10^{-5}$ m) knife gap. The film was dried on the glass plate at 120° C. for 120 minutes, removed from the plate, cooled to room temperature and air-dried overnight. The film was further dried in a vacuum oven (20 inches mercury) at 230° C. for 16 hours.

The film (film thickness=1.9 mils, $4.8 \times 10^{-5}$ m) were tested for mixed gas $O_2/N_2$(21/79 mole ratio) permeabilities at 500 psig ($34.5 \times 10^{-5}$ Pa), 25° C. The results are reported below:

$O_2$ Productivity: 3.07 Barrer
$O_2/N_2$ Selectivity: 6.78.

EXAMPLE 3

To a stirred solution of 4,4'-bis(4-aminophenoxy)-3,3'-di-tert-butylbiphenyl (8.65 g, 0.018 mol), 1,3-bis(3-aminophenoxy)benzene (3.51 g, 0.012 mol) and N-methylpyrrolidone (100 ml) was added 4,4'-[2,2,2-trifluoro-1-(trifluoromethyl)ethylidene]-bis (1,2-benzenedicaroboxylic acid anhydride) ("6FDA", 13.33 g, 0.030 mol) under an inert atmosphere at room temperature. After stirring overnight at room temperature, triethylamine (7.0 g, 0.069 mol) and acetic anhydride (7.0 g, 0.069 mol) were added with rapid stirring. After stirring the solution at room temperature for 3 hours, the polymer was precipitated into methanol and air-dried overnight. The polymer was further dried in a vacuum oven (20 inches mercury) at 230° C. for 16 hours to give 21.5 g (I.V.=0.86, 0.5 wt. % polymer in NMP, dL/g).

A film of the above polymer was cast from a 20% solids NMP solution onto a glass plate at 120° C. using a 15 mil ($28 \times 10^{-5}$ m) knife gap. The film was dried on the glass plate at 120° C. for 2 hours and then removed and air-dried overnight at room temperature. The film was further dried at 230° C. in a vacuum oven (20 inches mercury) for 16 hours.

The above film (film thickness=2.04 mil, $5.18 \times 10^{-5}$ m) was tested for mixed gas $O_2/N_2$ (21/79) permeabilities at 500 psig ($34.5 \times 10^{-5}$ Pa), 25° C. The results are reported below:

$O_2$ Productivity: 2.78 Barrer
$O_2/N_2$ Selectivity: 6.88.

EXAMPLE 4

Same procedure as Example 3 except the solution contained 4,4'-bis(4-aminophenoxy)-3,3'-di-tert-butylbipheyl (10.81 g, 0.0225 mol), 1,3,5-trimethyl-2,4-diaminobenzene ("DAM", 1.13 g, 0.0075 mol), N-methylpyrrolidone (90 ml) and 5,5'-dulfonylbis-1,3-isobenzofurandione ("DSDA", 10.75 g, 0.030 mol). The reaction solution was stirred overnight at room temperature. Triethylamine (7.0 g, 0.069 mol) was added with rapid stirring. After 5 minutes acetic anhydride (7.0 g, 0.069 mol) was added and the reaction mixture was heated to 100° C. for 2 hours. The solution was then cooled to room temperature, precipitated into water, washed with water and methanol successively, and air-dried overnight. The polymer was further dried in a vacuum oven at 230° C. for 15 hours to give 20.5 g of light brown material (I.V.=0.68, 0.5 wt. % polymer in NMP, dL/g).

A film of the above polymer was cast from a 25% solids NMP solution onto a glass plate at 120° C. using a 15 mil (38×10$^{-5}$ m) knife gap. The film was dried on the glass plate at 120° C. for 2 hours, removed from the plate and air-dried overnight at room temperature. The film was further dried at 230° C. in a vacuum oven (20 inches mercury) for 16 hours.

The above film (film thickness=2.30 mils, 5.84×10$^{-5}$ m) was tested for mixed gas $O_2/N_2$ (21/79) permeabilities at 500 psig (34.5×10$^{-5}$ Pa), 25° C. The results are reported below:
$O_2$ Productivity: 5.36 Barrer
$O_2/N_2$ Selectivity: 6.31.

EXAMPLE 5

To a stirred solution of 4,4'-bis(4-aminophenoxy)-3,3'-di-tert-butylbiphenyl (12.02 g, 0.025 mol), pyridine (2.4 g, 0.30 mol), and N-methylpyrrolidone (90 ml) was portionwise added 1,2,4-benzenetricarboxylic anhydride acid chloride ("TMAC", 5.27 g, 0.025 mol) under an inert atmosphere at room temperature. The reaction solution was allowed to stir overnight at room temperature. A solution of triethylamine (3.0 g, 0.030 mol) and acetic anhydride (3.0 g, 0.030 mol) was added with rapid stirring. The reaction solution was stirred for 2 hours at room temperature and the polymer was precipitated into water. The yellow polymer was washed with water and methanol successively. The polymer was air-dried overnight at room temperature and then dried in a vacuum oven (20 inches mercury) at 230° C. for 3 hours to yield 15.7 g polymer (I.V.=0.75, 0.5 wt. % polymer in NMP, dL/g).

The resulting polyamide-imide was soluble in N-methylpyrrolidone, N,N'-dimethylacetamide, and dichloromethane.

A film of the above polyamide-imide was cast from 20 wt. % solution in NMP onto a glass plate at 120° C. with 15-mil (38×10$^{-5}$ m) knife gap. The film was dried on the plate at 120° C. for 120 minutes, removed from the plate, cooled to room temperature and air-dried overnight. The film was further dried in a vacuum oven (20 inches mercury) at 230° C. for 18 hours.

The above film (film thickness=1.47 mils) was tested for mixed gas $O_2/N_2$ (21/79 mole ratio) permeabilities at 500 psig (34.5×10$^{-5}$ Pa), 25° C. The results are reported below:
$O_2$ Productivity: 3.7 Barrer
$O_2/N_2$ Selectivity: 6.22.

EXAMPLE 6

To a stirred solution of 4,4'-(4-aminophenoxy)-3,3'-di-tert-butylbiphenyl (14.42 g, 0.030 mol), pyridine (5.6 g, 0.070 mol), and N-methylpyrrolidone (80 ml) at 0° C. under an inert atmosphere was added a mixture of isophthaloyl/terephthaloyl chloride (70/30 mole ratio) (6.09 g, 0.030 mol) in N-methylpyrrolidone (20 ml). After addition was complete, the reaction mixture was allowed to warm to room temperature and stir overnight. The polymer was precipitated into water and washed successively with water and methanol. The polymer was air-dried overnight at room temperature, followed by further drying in a vacuum oven (20 inches mercury) at 230° C. for 3 hours to give 19.6 g of polymer (I.V.=1.36, 0.5 wt. % polymer in DMAC [% LiCl added], dL/g).

A film of the above polyaide was cast from 15 wt. % solution in NMP onto a glass plate at 120° C. with 15-mil (38×10$^{-5}$ m) knife gap. The film was dried on the plate at 120° C. for 120 minutes, removed from the plate, cooled to room temperature and air-dried overnight. The film was further dried in a vacuum oven (20 inches mercury) at 230° C. for 18 hours.

The above film (film thickness=2.05 mils) was tested for mixed gas $O_2/N_2$ (21/79 mole ratio) permeabilities at 500 psig (34.5×10$^{-5}$ Pa), 25° C. The results are reported below:
$O_2$ Productivity: 3.1 Barrer
$O_2/N_2$ Selectivity: 6.26.

EXAMPLE 7-15

Polyimide films were made by the following method: To a stirred solution of Diamine 1 and/or Diamine 2 (in the fractions specified in Table 1) in N-methylpyrrolidone (750 ml) was portionwise added Dianhydride 1 and/or Dianhydride 2 (in the fractions specified in Table 1) under an inert atmosphere at room temperature. The solution was allowed to stir overnight at room temperature. A solution of triethylamine (45.5 g, 0.45 mol), acetic anhydride (46.0 g, 0.45 mol) and N-methylpyrrolidone (100 ml) was added with rapid stirring at room temperature. The reaction mixture was heated to 100° C. for 2 hours. After cooling the reaction mixture to room temperature, the polymer was precipitated into water. The polymer was washed with water and methanol. The polymer was air-dried overnight at room temperature and then dried in a vacuum oven (20 inches mercury) at 230° C. for 3 hours.

A film of the above polyimide was cast from a 20% solution in N-methylpyrrolidone onto a glass plate at 120° C. with 15-mil (38×10$^{-5}$m) knife gap. The films were dried on the plate at 120° C. for 60–120 minutes, cooled to room temperature and air-dried overnight. The films were then further dried in a vacuum over (20 inches mercury) at 230° C. for 18 hours.

The above films (film thickness=2.0 mils) were tested for mixed gas $O_2/N_2$ (21/79 mole ratio) permeabilities at 500 psig (34.5×10$^{-5}$ Pa) at 25° C. The reactants are defined in the Legend and the results are reported in Table 1 below:

TABLE 1

| Example | Diamine 1 | Diamine 2 | Mole % 1/ Mole % 2 | Dian 1 | Dian 2 | Dian 1/ Dian 2 | Permeability $O_2$ | Selectivity $O_2/N_2$ |
| --- | --- | --- | --- | --- | --- | --- | --- | --- |
| 7 | A | — | 100 | Z | — | 100 | 11.02 | 5.34 |
| 8 | A | — | 100 | Z | W | 50/50 | 6.09 | 5.84 |
| 9 | A | — | 100 | Y | — | 100 | 3.10 | 6.61 |
| 10 | A | — | 100 | X | — | 100 | 2.23 | 6.72 |
| 11 | A | B | 75/25 | Y | — | 100 | 5.36 | 6.31 |
| 12 | A | C | 75/25 | Z | — | 100 | 6.16 | 6.27 |
| 13 | A | C | 75/25 | Z | Y | 75/25 | 3.67 | 6.50 |
| 14 | A | C | 50/50 | Z | — | 100 | 2.10 | 7.13 |
| 15 | A | D | 50/50 | W | — | 100 | 2.36 | 6.83 |

Permeability of $O_2$ in Barrers

EXAMPLES 16 AND 17

Polyamide-imide films were made by the following method: To a stirred solution of Diamine 1 and/or Diamine 2 (in the fractions specified in Table 2) pyridine (2.4 g, 0.30 mol), and N-methylpyrrolidone (90 ml) was portionwise added Dianhydride Acid Chloride 1 and-/or Diahnydride Acid Chloride 2 (in the fractions specified in Table 2) under an inert atmosphere at room temperature. The reaction solution was allowed to stir overnight at room temperature. A solution of triethylamine (3.0 g, 0.030 mol) and acetic anhydride (3.0 g, 0.030 mol) was added with rapid stirring. The reaction solution was stirred for 2 hours at room temperature and the polymer was precipitated into water. The polymer was washed with water and methanol successively. The polymer was air-dried overnight at room temperature and then dried in a vacuum oven (20 inches mercury) at 230° C. for 3 hours.

A film of the above polyamide-imide was cast from 20 wt. % solution in NMP onto a glass plate at 120° C. with 15-mil ($38 \times 10^{-5}$ m) knife gap. The film was dried on the plate at 120° C. for 120 minutes, removed from the plate, cooled to room temperature and air-dried overnight. The film was further dried in a vacuum oven (20 inches mercury) at 230° C. for 18 hours.

The above film (film thickness=1.47 mils) was tested for mixed gas $O_2/N_2$ (21/79 mole ratio) permeabilities at 500 psig ($34.5 \times 10^{-5}$ Pa), 5° C. The reactants are defined in the Legend and the results are reported in Table 2 below.

TABLE 2

| Example | Diamine 1 | Diamine 2 | Mole % 1 Mole % 2 | Dian 1 Acid Cl | Dian 2 Acid Cl | Mole % 1 Mole % 2 | Permeability $O_2$ | Selectivity $O_2/N_2$ |
|---------|-----------|-----------|-------------------|----------------|----------------|-------------------|--------------------|-----------------------|
| 16 | A | — | 100 | V | — | 100 | 3.68 | 6.22 |
| 17 | A | — | 100 | Y | U | 50/50 | 1.13 | 6.76 |

Permeability of $O_2$ in Barrers

EXAMPLES 18-20

Polyamide films were made using the following method: To a stirred solution of Diamine 1 and/or Diamine 2 (in the fractions specified in Table 3), pyridine (5.6 g, 0.070 mol), and N-methylpyrrolidone (80 ml) at 0° C. under an inert atmosphere was added a mixture of Acid Chloride 1 and/or Acid Chloride 2 (in the fractions specified in Table 3) in N-methylpyrrolidone (20 ml). After addition was complete, the reaction mixture was allowed to warm to room temperature and stir overnight. The polymer was precipitated into water and washed successively with water and methanol. The polymer was air-dried overnight at room temperature, followed by further drying in a vacuum oven (20 inches mercury) at 230° C. for 3 hours.

A film of the above polyamide was cast from 15 wt. % solution in NMP onto a glass plate at 120° C. with 15 mil ($38 \times 10^{-5}$ m) knife gap. The film was dried on the plate at 120° C. for 120 minutes, removed from the plate, cooled to room temperature and air-dried overnight. The film was further dried in a vacuum oven (20 inches mercury) at 230° C. for 18 hours.

The above film (film thickness=2.05 mils) was tested for mixed gas $O_2/N_2$ (21/79 mole ratio) permeabilities at 500 psig ($34.5 \times 10^{-5}$ Pa), 25° C. The reactants are defined in the Legend and the results are reported in Table 3 below:

TABLE 3

| Example | Diamine 1 | Diamine 2 | Mole % 1 Mole % 2 | Acid Cl 1 | Acid Cl 2 | % 1 % 2 | Permeability $O_2$ | Selectivity $O_2/N_2$ |
|---------|-----------|-----------|-------------------|-----------|-----------|---------|--------------------|-----------------------|
| 18 | A | — | 100 | T | S | 70/30 | 3.11 | 6.26 |
| 19 | A | C | 75/25 | U | R | 75/25 | 1.52 | 6.77 |
| 20 | A | — | 100 | R | — | 100 | 7.67 | 5.72 |

Permeability of $O_2$ in Barrers

LEGEND

A = 4,4'-bis(4-aminophenoxy)-3,3'-di-tert-butylbiphenyl (APDBBP)
B = diaminomesitylene (DAM)
C = 1,3-bis (3-aminophenoxy) benzene (APB-133)
D = diaminophenylindane (DAPI)
Z = 4,4'-[2,2,2-trifluoro-1(trifluoromethyl) ethylidene]-bis (1,2-benzenedicarboxylic acid dianhydride) (6FDA)
Y = 5.5'-sulfonylbis-1,3-isobenzofurandione (DSDA) (diphenylsulfone dianhydride)
X = 5,5'-oxy-bis-1,3-isobenzofurandione (ODPA) (oxyphthalic dianhydride)
W = 3,3',4,4'-benzophenonetetracarboxylic acid dianhydride (BTDA)
U = (70/30) mixture of isophthaloyl/terephthaloyl chloride (I/T)
T = Isophthaloyl chloride
S = Terephthaloyl chloride
R = 5-t-Butylisophthaloyl chloride (BIPC)
V = 1,2,4-benzenetricarboxylic anhydride acid chloride (TMAC)

What is claimed is:

1. A gas separation membrane formed from an aromatic polyimide comprising repeating units of the formula:

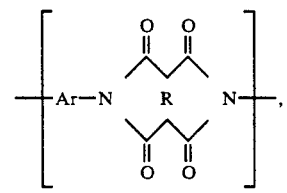

where —Ar— is 0-99% of any aromatic diamine moiety and 1-100% of an aromatic diamine moiety having the following formula:

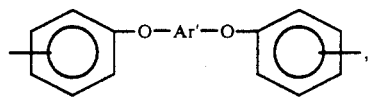

where —Ar'— is

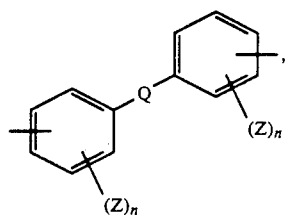

where Q=nothing or R' where

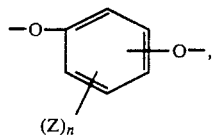

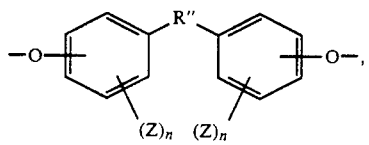

—R'— is

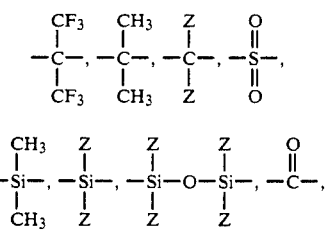

or mixtures thereof, where Z is independently alkyl groups having 1 to 6 carbon atoms, aromatic groups having 6 to 12 carbon atoms, or halogen groups such as —F, —Cl, —Br, or —I, where n is an integer from 1 to 4; R" is

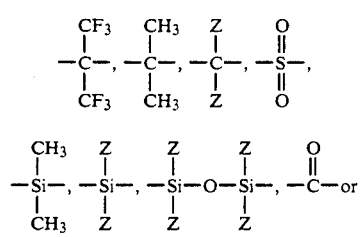

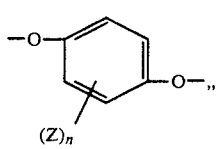

or mixtures thereof;

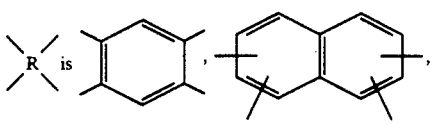

or mixtures thereof; and R''' is

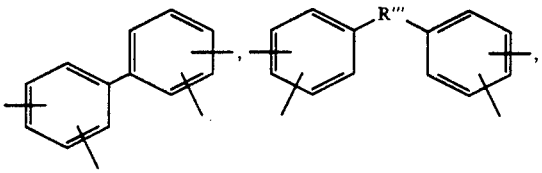

or mixtures thereof.

2. The membrane of claim 1 where Z is a tertiary butyl group and n=1.

3. The membrane of claim 2 where Ar is

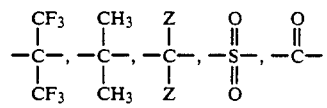

4. The membrane of claim 1 where R is

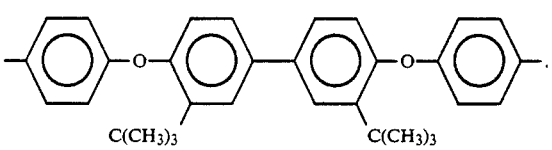

5. The membrane of claim 1 where R is

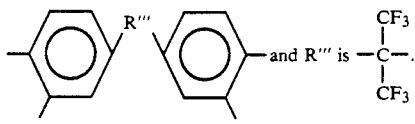

and R''' is selected from the group consisting of

6. The membrane of claim 1 where Ar is

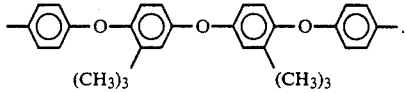

7. A process for separating one or more gases from a gaseous mixture comprising bringing said gaseous mixture into contact with a first side of the gas separation membrane of claim 1 in a manner to cause a portion of the mixture to pass through the membrane to a permeate side, the resulting gas mixture on the permeate side being enriched in one or more component over that of the mixture on the first side.

8. A gas separation membrane formed from an aromatic polyamide comprising repeating units of the formula:

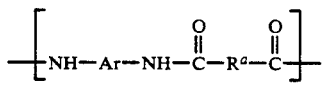

where —Ar— is 0-99% of any aromatic diamine moiety and 1-100% of an aromatic diamine moiety having the following formula:

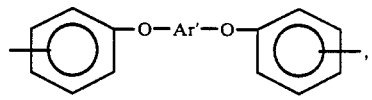

where —Ar'— is

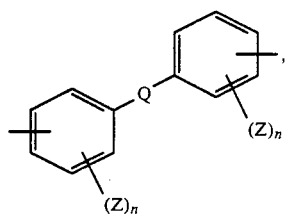

where Q=nothing or R' where

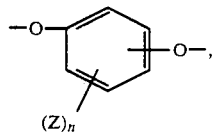

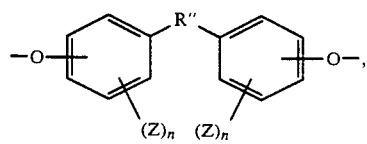

—R'— is

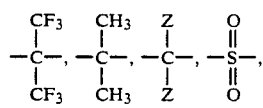

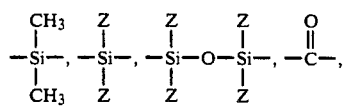

or mixtures thereof, where Z is independently alkyl groups having 1 to 6 carbon atoms, aromatic groups having 6 to 12 carbon atoms, or halogen groups such as —F, —Cl, —Br, or —I, where n is an integer from 1 to 4; R" is

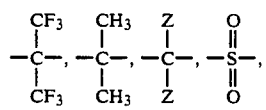

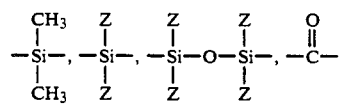

or

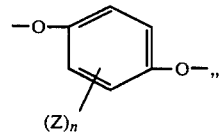

or mixtures thereof; and where $R^a$ is an aromatic diacid moiety.

9. The membrane of claim 8 where Z is a tertiary butyl group and n=1.

10. The membrane of claim 9 where $R^a$ is

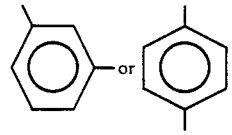

or mixtures thereof.

11. A process for separating one or more gases from a gaseous mixture comprising bringing said gaseous mixture into contact with a first side of the gas separation membrane of claim 8 in a manner to cause a portion of the mixture to pass through the membrane to a permeate side, the resulting gas mixture on the permeate side being enriched in one or more component over that of the mixture on the first side.

12. A gas separation membrane formed from an aromatic polyamide-imide comprising repeating units of the formula:

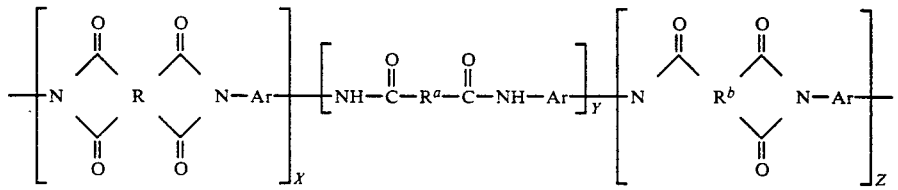

where Ar is independently 0-99% of any aromatic diamine moiety and 1-100% of an aromatic diamine moiety having the following formula:

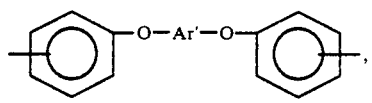

where —Ar'— is

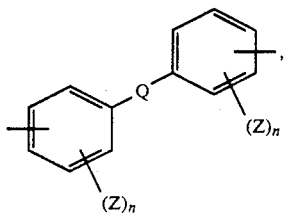

where Q=nothing or R' where;

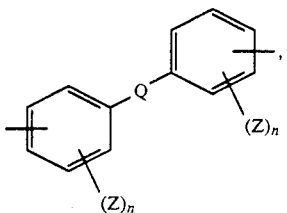

—R'— is

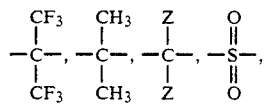

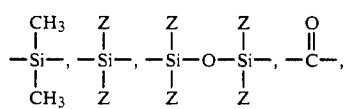

or mixtures thereof, where Z is independently alkyl groups having 1 to 6 carbon atoms, aromatic groups having 6 to 12 carbon atoms, or halogen groups such as —F, —Cl, —Br, or —I, where n is an integer from 1 to 4; R" is

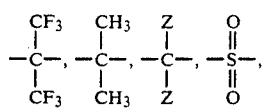

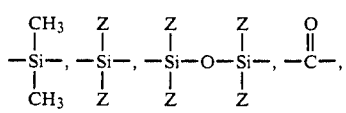

or

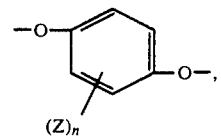

or mixtures thereof; where R is

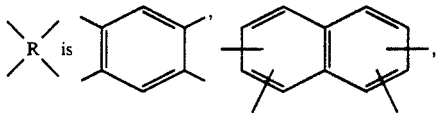

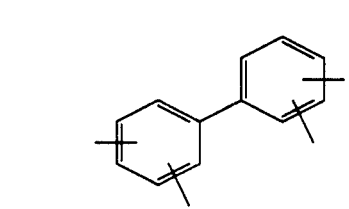

or mixtures thereof; and R''' is

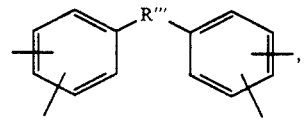

or mixture thereof; $R^a$ is any aromatic diacid moiety; $R^b$ is any aromatic triacid moiety; and x, y and z are fractions where $x+y+z=1.0$.

13. The membrane of claim 12 where Z is a tertiary butyl group and n=1.

14. The membrane of claim 12 where R is

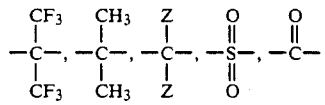

and R' is selected from the group consisting of

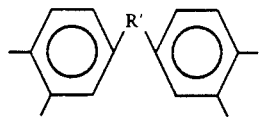

15. The membrane of claim 12 wherein R is

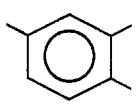

and $z>0$.

16. A gas separation membrane formed from an aromatic polyamide-imide comprising a blend of the polyimides comprising repeating units of the formula;

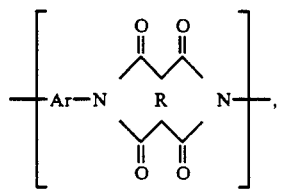

where —Ar— is 0-99% of any aromatic diamine moiety and 1-100% of an aromatic diamine moiety having the following formula;

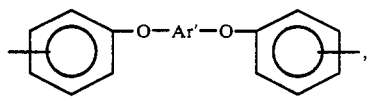

where —Ar'— is

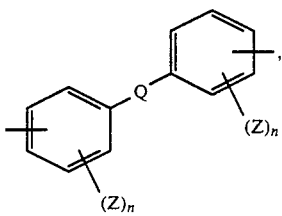

where Q=nothing or R' where

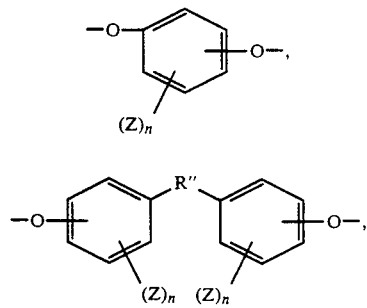

—R'— is

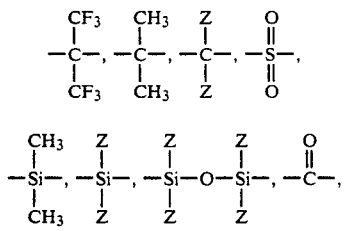

or mixtures thereof, where Z is independently alkyl groups having 1 to 6 carbon atoms, aromatic groups having 6 to 12 carbon atoms, or halogen groups such as —F, —Cl, —Br, or —I, where n is an integer from 1 to 4; R" is

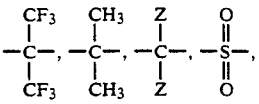

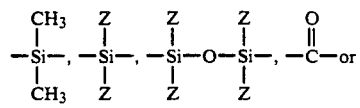

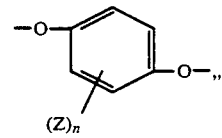

or mixtures thereof;

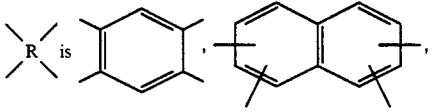 R is

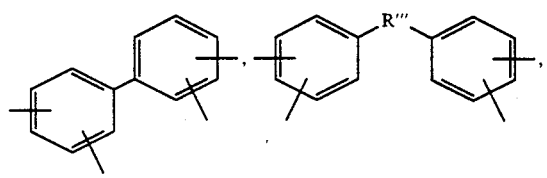

or mixtures thereof; and R''' is

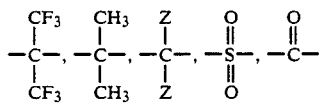

or mixtures thereof with the polyamides comprising repeating units of the formula;

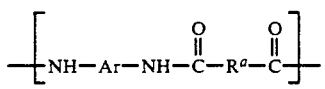

where —Ar— is 0-99% of any aromatic diamine moiety and 1-100% of an aromatic diamine moiety having the following formula;

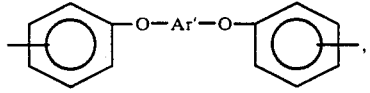

where —Ar'— is

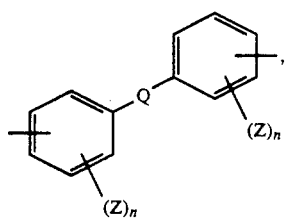

where Q = nothing or R' where

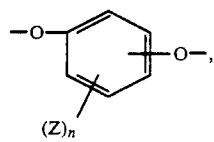

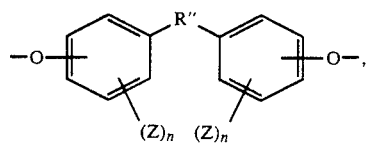

—R'— is

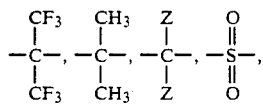

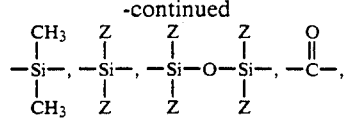

or mixtures thereof, where Z is independently alkyl groups having 1 to 6 carbon atoms, aromatic groups having 6 to 12 carbon atoms, or halogen groups such as —F, —Cl, —Br, or —I, where n is an integer from 1 to 4; R" is

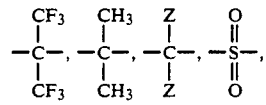

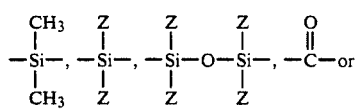

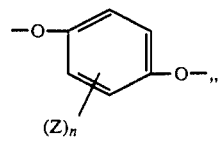

or mixtures thereof; and where $R^a$ is any aromatic diacid moiety.

17. A process for separating one or more gases from a gaseous mixture comprising bringing said gaseous mixture into contact with the first side of a gas separation membrane of claim 12 in a manner to cause a portion of the mixture to pass through the membrane to a permeate side, the resulting gas mixture on the permeate side being enriched in one or more component over that of the mixture on the first side.

* * * * *

UNITED STATES PATENT AND TRADEMARK OFFICE
CERTIFICATE OF CORRECTION

PATENT NO. : 5,266,100
DATED : Nov. 30, 1993
INVENTOR(S) : Simmons

It is certified that error appears in the above-indentified patent and that said Letters Patent is hereby corrected as shown below:

On the title page, item [73], add --L'Air Liquide S.A., Paris, France--.

Column 15, line 35, delete " -R'- is". Insert -- -R'- is -- at line 20 after "where".

Column 17, line 53, delete " -R'- is ". Insert -- -R'- is -- at line 37 after "where".

Column 19, line 37, delete " -R'- is". Insert -- -R'- is -- at line 25 after "where".

Column 21, line 52, delete " -R'- is". Insert -- -R'- is -- at line 36 after "where".

Column 23, line 32, delete " -R'- is". Insert -- -R'- is -- at line 14 after "where".

Signed and Sealed this

Thirty-first Day of May, 1994

Attest:

BRUCE LEHMAN

*Attesting Officer*     *Commissioner of Patents and Trademarks*